United States Patent
Eckstein et al.

(10) Patent No.: US 8,311,727 B2
(45) Date of Patent: Nov. 13, 2012

(54) MOTOR VEHICLE OPERATOR CONTROL SYSTEM

(75) Inventors: Lutz Eckstein, Aachen (DE); Josef Schumann, Munich (DE); Martin Zobl, Kaufering (DE); Christian Knoll, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/106,604

(22) Filed: May 12, 2011

(65) Prior Publication Data

US 2011/0251784 A1    Oct. 13, 2011

Related U.S. Application Data

(63) Continuation of application No. PCT/EP2009/007493, filed on Oct. 20, 2009.

(30) Foreign Application Priority Data

Nov. 13, 2008 (DE) .......................... 10 2008 056 974

(51) Int. Cl.
    *G01C 21/00* (2006.01)
(52) U.S. Cl. ....................................................... 701/200
(58) Field of Classification Search ........................ None
    See application file for complete search history.

(56) References Cited

U.S. PATENT DOCUMENTS

| | | | |
|---|---|---|---|
| 5,757,268 A | 5/1998 | Toffolo et al. | |
| 6,275,231 B1 | 8/2001 | Obradovich | |
| 6,647,338 B1 | 11/2003 | Hamberger et al. | |
| 2002/0008718 A1 | 1/2002 | Obradovich | |
| 2002/0154150 A1 | 10/2002 | Ogaki et al. | |
| 2004/0061662 A1* | 4/2004 | Yoshihara et al. | 345/1.1 |
| 2004/0193371 A1 | 9/2004 | Koshiji et al. | |
| 2006/0022521 A1 | 2/2006 | Szczerba et al. | |
| 2006/0112350 A1* | 5/2006 | Kato | 715/781 |
| 2006/0155431 A1 | 7/2006 | Berg et al. | |

(Continued)

FOREIGN PATENT DOCUMENTS

DE    101 51 282 A1    4/2003

(Continued)

OTHER PUBLICATIONS

Pohlmeyer, A. E. et al., "A Dynamic Content Visualization Framework to Optimize Driver Information Processing", Jul. 31, 2007 http://stuff.mit.edu/afs/Athena.mit.edu/dept/agelab/news_events/pdfs/Create_2007_Pohlmeyer_DCVF.pdf>.

(Continued)

*Primary Examiner* — Thomas Tarcza
*Assistant Examiner* — Nagi Murshed
(74) *Attorney, Agent, or Firm* — Crowell & Moring LLP

(57) ABSTRACT

A motor vehicle operating system includes a navigation system for providing road map information, a vehicle monitoring system for providing vehicle information, a display device for displaying road map information and vehicle information, an operating device for detecting an operating action and a control device. The control device is set up and coupled with the navigation system, the vehicle monitoring system, the display device and the operating device such that, in a zoom operating condition, in at least one predefined operating situation or zoom situation, particularly in the case of the adjustment of the zoom factor to a limit value. A switching-over takes place from the zoom operating condition to a monitoring operating condition by way of an additional zoom operating action.

11 Claims, 4 Drawing Sheets

U.S. PATENT DOCUMENTS

| | | | | |
|---|---|---|---|---|
| 2006/0200285 | A1* | 9/2006 | Obradovich | 701/30 |
| 2007/0226646 | A1* | 9/2007 | Nagiyama et al. | 715/784 |
| 2009/0297062 | A1* | 12/2009 | Molne et al. | 382/289 |

FOREIGN PATENT DOCUMENTS

| | | | |
|---|---|---|---|
| EP | 0 893 750 | A1 | 1/1999 |
| EP | 0 893 750 | B1 | 9/2003 |
| JP | 2009-205302 | A | 9/2009 |

OTHER PUBLICATIONS

German Search Report dated Aug. 18, 2010 including partial English-language translation (Nine (9) pages).

International Search Report dated Jan. 27, 2010 including English-language translation (Six (6) pages).

International Preliminary Report on Patentability with Written Opinion. (nine (9) pages).

* cited by examiner

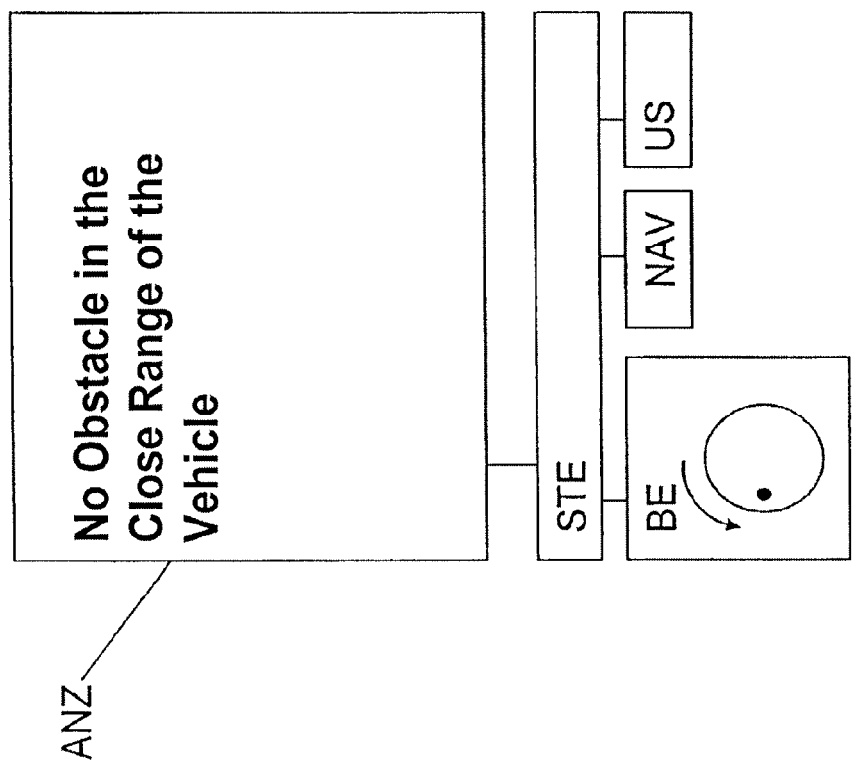

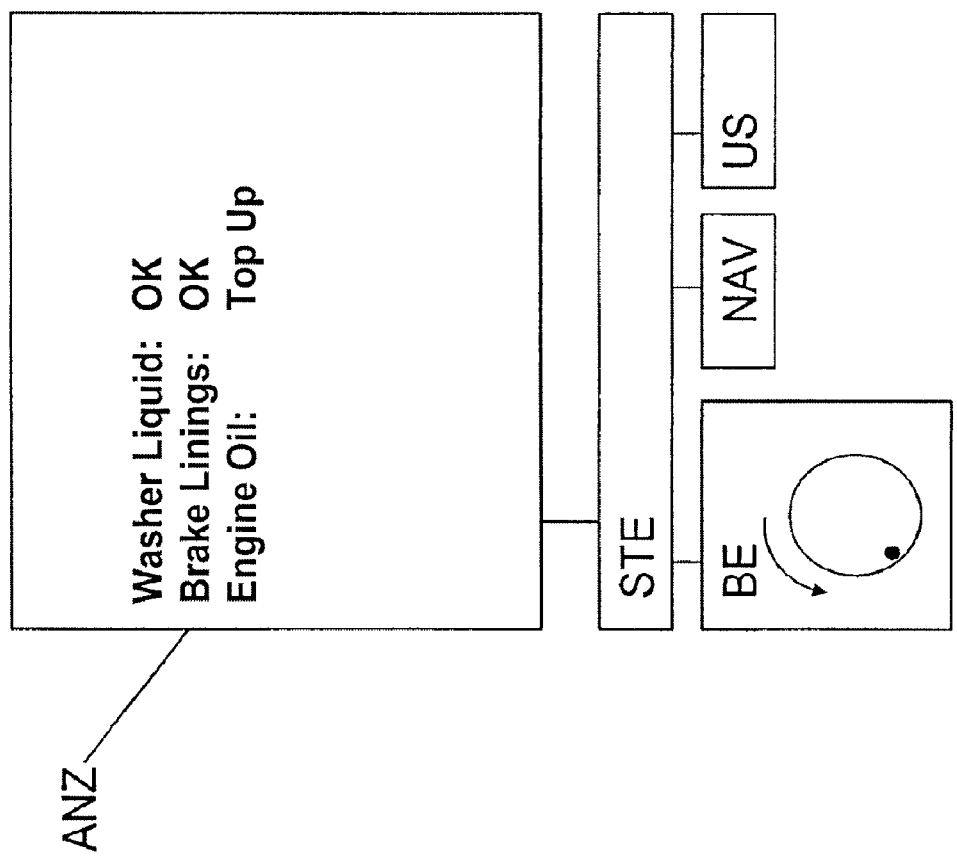

MOTOR VEHICLE OPERATOR CONTROL SYSTEM

CROSS-REFERENCE TO RELATED APPLICATIONS

This application is a continuation of PCT International Application No. PCT/EP2009/007493, filed Oct. 20, 2009, which claims priority under 35 U.S.C. §119 from German Patent Application No. DE 10 2008 056 974.7, filed Nov. 13, 2008, the entire disclosures of which are herein expressly incorporated by reference.

This application contains subject matter related to U.S. application Ser. No. 13/106,535, entitled "Motor Vehicle," filed on even date herewith.

BACKGROUND AND SUMMARY OF THE INVENTION

The invention relates to a motor vehicle operating system.

Current motor vehicles increasingly have an operating unit, which is constructed separately from a display device, in the area of the center console. Such an operating unit is known, for example, from EP 0893750 B1. In this case, the operating unit has a switching element which can be bidirectionally rotated about its axis of symmetry and, in addition, is disposed to be axially movable (by pressure) and swivelable. For example, menu items on a display device can be marked and selected or parameters can be adjusted by rotating, pressing or swiveling the switching element.

It is also known to adjust the zoom factor, particularly the display scale, of a road map display of a motor vehicle navigation system by rotating such an operating unit. Within the scope of the invention, the term "zoom" also comprises the term "display scale change".

Monitoring systems, such as vehicle check-control systems are also known which are based, for example, on various sensors and a central control device. By means of such monitoring systems, for example, the surroundings of the vehicle or the condition of the vehicle, particularly of fuel and wearing parts, can be monitored. If a defect or a critical condition is detected, a control light is, for example, automatically activated, or another monitoring signal is emitted. Monitoring systems are also known which detect and analyze the surroundings of one's own vehicle in order to assist the driver in his driving task by means of suitable information, a warning or a supporting action (driver assistance system).

In addition or as an alternative, it is also known to provide the user with the possibility of accessing vehicle information provided by the monitoring system, particularly driver assistance information (and thereby driver assistance functions) and/or information on the surroundings, by use of an operating element, such as a key. Such an access to monitoring information, particularly driver assistance information, check-control information and/or information on the environment can take place by the selection of a menu item by use of the above-mentioned operating unit.

Particularly, manual access to vehicle information provided by the monitoring system, as a rule, is complicated and not intuitive. Furthermore, access to different vehicle information, such as information of the navigation system, information of the driver assistance and check-control information so far has taken place in a non-uniform manner, particularly by way of different operating elements and displays.

It is an object of the invention to provide an improved motor vehicle operating system.

This object is achieved by a motor vehicle operating system comprising a navigation system for providing road map information; a vehicle monitoring system for providing vehicle information; a display device for displaying road map information and vehicle information; an operating device for detecting an operating action; and a control device. The control device is operatively configured with the navigation system, the vehicle monitoring system, the display device and the operating device such that: in a zoom operating condition, road map information is displayed on the display device; in a monitoring operating condition, vehicle information is displayed on the display device; in the zoom operating condition, by at least one predefined zoom operating action, the zoom factor for the display of the road map information can be adjusted between two limit values; and in the zoom operating condition, in at least one predefined operating situation or zoom situation, particularly in the case of the adjustment of the zoom factor to a limit value, by way of an additional zoom operating action, a switching-over takes place from the zoom operating condition to the monitoring operating condition.

Advantageously, the invention is based on not changing the zoom factor in a certain operating situation by a zoom operating action which, as a rule, is used for changing a zoom factor or display scale, but rather changing an operating condition, particularly switching a display device to vehicle information. Preferably, a switching between different vehicle information can take place by an additional zoom operating action.

A preferred motor vehicle operating system comprises a navigation system for providing road map information, a vehicle monitoring system for providing vehicle information, such as a driver assistance system for providing information concerning the vehicle environment, a display device for the alternative or additional display of road map information and vehicle information, an operating device for detecting an operating action and a control device.

The control device is set up and coupled with the navigation system, the vehicle monitoring system, the display device and the operating device such that, in a zoom operating condition, road map information is displayed on the display device. In a monitoring operating condition, vehicle information is displayed on the display device. In the zoom operating condition, by at least one predefined zoom operating action, the zoom factor for the display of the road map information can be adjusted particularly between two limit values (a limit value may also be infinite or zero). In the zoom operating condition, in at least one or precisely one predefined operating situation or zoom situation, particularly during the adjustment of the zoom factor to a predefined limit value, by way of an additional zoom operating action, a switching-over takes place from the zoom operating condition to the monitoring operating condition. In particular, in this case, the display device is switched from the navigation system to the vehicle monitoring system, and/or the display device is switched from the display of the road map information to the display of the vehicle information. An operating action that differs from the zoom operating action is preferably not required for the switching between the operating conditions. The zoom operating actions are preferably identical (for example, rotation of an operating element about a predefined angle of rotation) and are detected by the same operating device.

Preferably, no road map information is displayed on the display device in the monitoring operating condition. As an alternative or in addition, preferably vehicle information that is shown in the monitoring operating condition is not shown in the zoom operating condition, or in the zoom operating condition, vehicle information is preferably displayed different than in the monitoring operating condition. Turn-off arrows or driving maneuver information are preferably not part of the road map information.

However, it is also within the scope of the invention that vehicle information is also displayed on the display device during the zoom operating condition and/or road map information is also displayed in the monitoring operating condition.

The zoom operating condition preferably differs from the monitoring operating condition in that, in the zoom operating condition, the zoom factor of the display of the road map information is changed by a zoom operating action, while, during the monitoring operating condition, the zoom factor of the display of the road map information is not changed by a zoom operating action.

A change of the zoom factor can be connected with a change of the type of display (2D, 3D, perspective).

The display device is preferably formed by a display window or a section of a larger display device or of a display.

By means of the invention, for example, in a zoom operating condition, as a result of successive identical operating actions, such as the rotating of an operating device or of an operating element of the operating device by a predefined angle of rotation, the zoom factor of a road map display is first changed little by little up to a maximal zoom factor at which the road map is displayed in a maximal enlargement. If now, at this adjusted maximal zoom factor, a further identical operation by the operating device is detected, instead of a further enlargement of the road map display, a switching of the display to vehicle information is caused (monitoring operating condition), which vehicle information is determined and made available by a vehicle monitoring system. By means of an operating action directed against or acting against the above-mentioned operating action, for example, the rotation of the operating device or of an operating element about a predefined angle of rotation in the opposite rotating direction, the display is, for example, switched over again to the road map display (zoom operating condition). Within the monitoring operating condition, a switching-over can take place, for example, by identical operating actions between different partial monitoring operating conditions in which different vehicle information is displayed.

By means of the invention, a simpler, faster and more intuitive manually triggered access is permitted to vehicle information made available by a monitoring system. In this case, the zoom principle is expanded: first, the zoom factor is enlarged by zoom operating actions in a manner known per se, and the vehicle or the vehicle environment is therefore displayed to be increasingly larger. Finally, when a zoom factor is maximal and the display of the vehicle or of the vehicle environment is therefore maximally enlarged, an expected switching of the display takes place, for example, such that the vehicle is no longer observed from the outside but from the inside, or the vehicle is no longer observed relative to the road map but a vehicle area or a vehicle component is observed relative to the vehicle, and corresponding vehicle information is displayed concerning this vehicle component.

This corresponds to the natural information sequence expected by the user, particularly the image sequence that would be produced by a virtual camera which, corresponding to the zoom operating actions, approaches the vehicle from an at first large distance. First, the position of the vehicle relative to the road system is detected, and then the closer environment of the vehicle is detected, for example, in the monitoring operating condition. Finally, when the vehicle skin is reached, the virtual camera will penetrate this skin for monitoring the interior of the vehicle in the monitoring operating condition in order to indicate, for example, vehicle information provided by vehicle monitoring systems.

The monitoring operating condition preferably is broken down into a plurality of partial monitoring operating conditions between which a switching takes place also by means of the zoom operating action. As a result, different vehicle information can be called by simple and intuitive operating actions. For example, the following partial monitoring operating conditions can be provided: a partial driving situation operating condition with a forecast (for example, the display of guiding info, traffic info, etc.), a partial driver assistance operating condition with a vehicle display and traffic information or a "partial technology experience operating condition" (for example, with a display of hybrid functions), a partial check-control operating conditions.

In the monitoring operating condition, particularly in a predefined partial monitoring operating condition, preferably a switch-over from the monitoring operating condition, particularly from the predefined partial monitoring operation condition, back into the zoom operating condition can take place by way of a further zoom operating action.

A first partial monitoring operating condition (for example, the monitoring of a vehicle environment) preferably relates to a first vehicle area, and a second partial monitoring operation condition (for example, the monitoring of the engine oil) preferably relates to a second vehicle area (engine compartment). The second vehicle area is situated closer to the vehicle center than the first vehicle area. Starting from the zoom operating condition, fewer zoom operating actions will then preferably be required for switching into the first partial monitoring operating condition than for switching into the second partial monitoring operating condition.

An advantageous further development provides that a zoom operating action includes a rotation of the operating device, particularly about a predefined angle of rotation. As an alternative, the operating device may also have a rocker element.

The vehicle monitoring system preferably monitors the degree of wear of vehicle components, the level of fluid tanks, the vehicle environment, the tire pressure and/or provides driver assistance information (for example, the system status, action information, traffic situation information, etc.).

Particularly preferably, it is provided that, in the zoom operating condition, a graphic motor vehicle object is displayed on the display device, by which graphic object the position of the motor vehicle is marked relative to the road map information.

Preferably, a graphic motor vehicle object is also displayed on the display device in the monitoring operating condition, by which graphic object a component or an area is marked to which the vehicle information relates which is shown in the monitoring operating condition. The graphic motor vehicle object is preferably automatically displayed larger in the case of a fairly large zoom factor than in the case of a fairly small zoom factor. The graphic motor vehicle object displayed in the monitoring operating condition is advantageously larger than the graphic motor vehicle object displayed in the zoom operating condition. Apart from the size, the graphic motor vehicle object may be identical or similar in both operating conditions, especially with respect to the shaping of the contour and/or the perspective.

Also within the scope of the invention is a motor vehicle operating system having a first information source for providing first information, having a second information source for providing second information, having a display device for the alternate or simultaneous display of the first and the second information, having an operating device for detecting an operating action and having a control device which is set up and coupled with the information sources, the display device and the operating device such that, in a first operating condition, first information is displayed on the display device, that, in a second operating condition, second information is displayed on the display device, that, in the first operating condition, by means of at least one predefined zoom operating action, the zoom factor can be adjusted for the display of the first information particularly between two limit values (a limit value may also be infinite or zero), and that, in the first operating condition, in at least one predefined operating situation or zoom situation, particularly when adjusting the zoom factor to a limit value, by means of a further zoom operating action, a switch-over takes place from the first operating condition to the second operating condition. In the second operating condition, a switching preferably takes place between partial operating conditions by means of additional zoom operating actions. A zoom factor representing a display scale is not switched by further zoom operating actions in the second operating condition particularly with respect to the display of the first information.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a simplified block diagram of a motor vehicle operating system in a first partial monitoring operating condition; and FIG. 4 is a simplified block diagram of a motor vehicle operating system in a second partial monitoring operating condition.

DETAILED DESCRIPTION OF THE DRAWINGS

Figure 1:
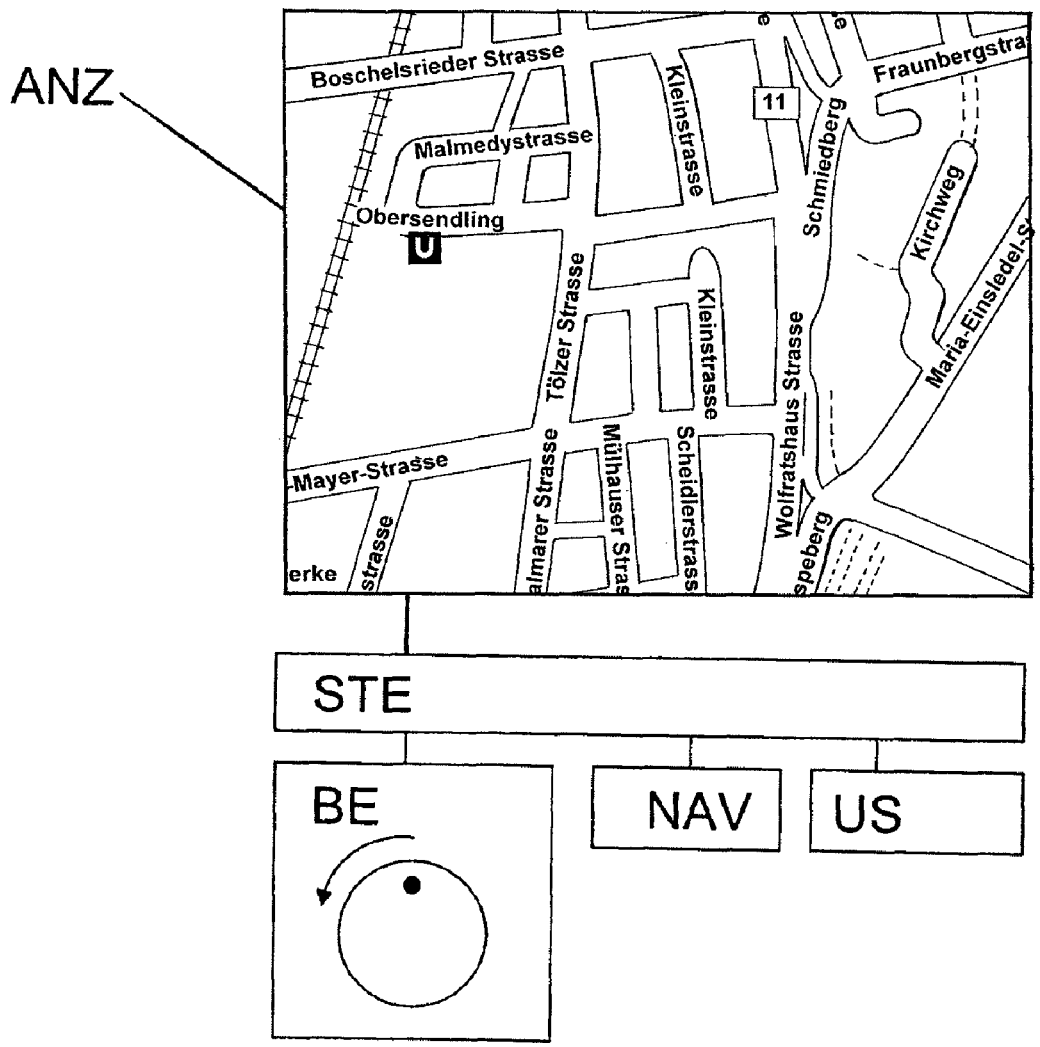
FIG. 1 is a simplified block diagram of a motor vehicle operating system in the zoom operating condition in the case of a first zoom factor.

A motor vehicle operating system is known per se and is schematically illustrated in FIG. 1. As the display device ANZ, it includes a display or a display section, a navigation system NAV, a monitoring system US and an operating system BE, which operating system includes a rotating element. These components are mutually coupled by one or more control devices STE.

In particular, the control device STE is now set up according to an embodiment of the invention such that road map information is displayed on the display device ANZ in a zoom operating condition, and vehicle information is displayed in a monitoring operating condition.

In the zoom operating condition, the zoom factor for the display of the road map information can be adjusted particularly between two limit values by way of at least one predefined zoom operating action. In at least one predefined operating situation or zoom situation, particularly when adjusting the zoom factor to a limit value, a switch-over takes place from the zoom operating condition to the monitoring operating condition by way of a further zoom operating action.

In FIG. 1, the system is in the zoom operating condition. The zoom factor is set to a first value, according to which the display of the digital road map takes place on the display device ANZ.

Figure 2:
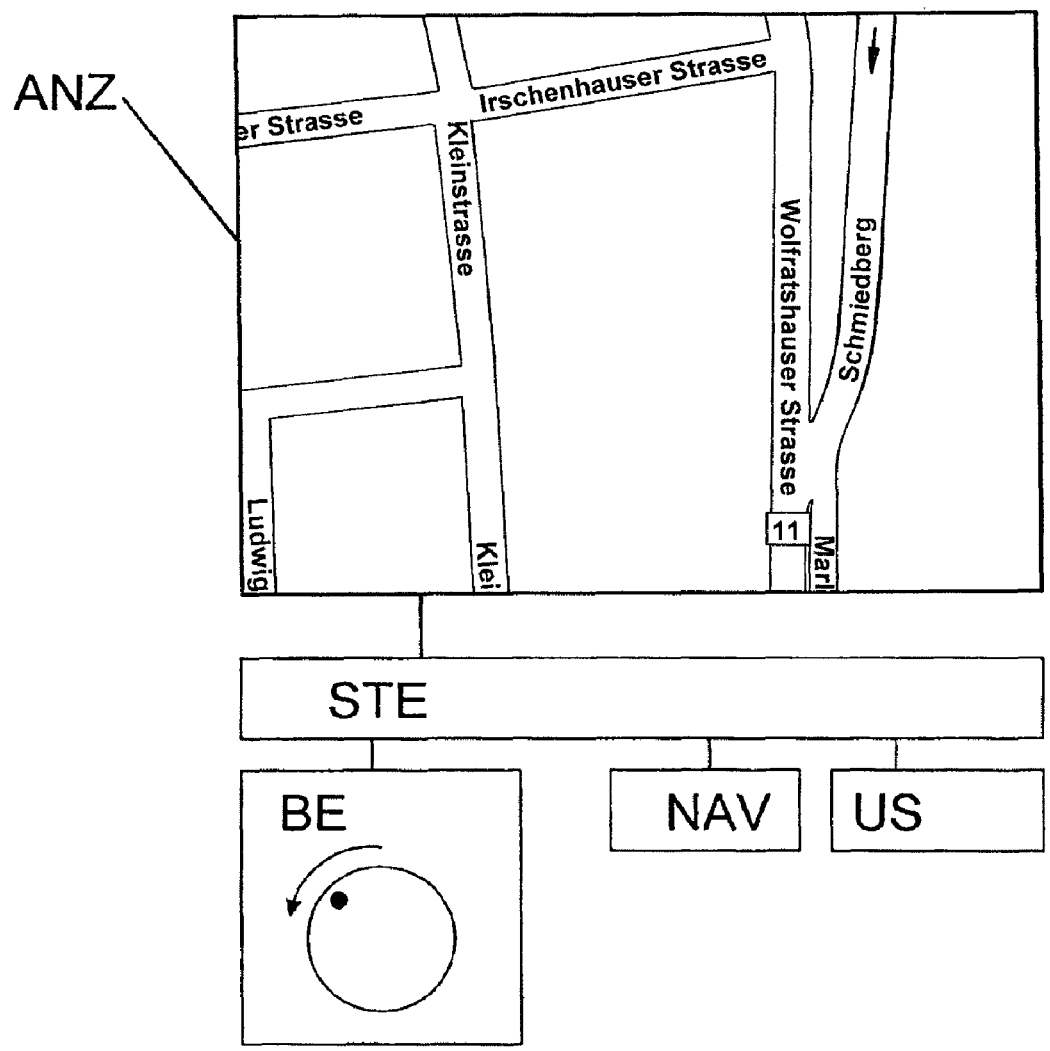
FIG. 2 is a simplified block diagram of a motor vehicle operating system in the zoom operating condition in the case of a second zoom factor.

If, as illustrated in FIG. 2, the rotating element BE is now rotated counterclockwise about an angle of rotation of 45 degrees, the zoom factor will be set to a second value which, in this example, is greater than the first value and, in addition, equal to the maximal limit value for the zoom factor. The enlargement of the display of the digital road map on the display device will now take place according to the maximal limit value for the zoom factor.

If now, in this special operating situation, the rotating element BE, as illustrated in FIG. 3, is again rotated counterclockwise about an angle of rotation of 45 degrees, an automatic switch-over takes place from the zoom operating condition to a monitoring operating condition, particularly a first partial monitoring operating condition, in which vehicle information is displayed which describes or represents the vehicle environment. The vehicle environment is monitored, for example, by a near-field detection system known per se or a Park Distance Control (PDC).

If now, as illustrated in FIG. 4, the rotating element BE is again rotated counterclockwise about an angle of rotation of 45 degrees, an automatic switch-over takes place from the first partial monitoring operating condition to a second partial monitoring operating condition, in which vehicle information is displayed which describes or represents wearable components and/or fuel and/or fluid levels of the vehicle.

Starting from the operating condition described in FIG. 4, by means of successive clockwise rotations of the rotating element BE by 45 degree, a switch-over can take place little by little back into the operating condition according to FIG. 3, the operating condition according to FIG. 2 and the operating condition according to FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle operating system for a motor vehicle, comprising:
 a navigation system for providing road map information;
 a vehicle monitoring system for providing vehicle information for the motor vehicle;
 a display device for displaying the road map information and the vehicle information;
 an operating device for detecting a rotational operating action of the operating device; and
 a control device operatively configured with the navigation system, the vehicle monitoring system, the display device and the operating device, wherein:
  in a monitoring operating condition, the vehicle information for the motor vehicle is displayed on the display device;
  in the zoom operating condition, the road map information is displayed on the display device, and a display scale for the display of the road map information is adjustable between two limit values via the rotational operating action of the operating device; and
  in the zoom operating condition, an automatic switching-over takes place from the zoom operating condition to the monitoring operating condition in response to an additional rotational operating action of the operating device beyond a rotational point corresponding to the display scale being adjusted to one of the two limit values, and wherein the display scale of the display remains constant while in the monitoring operating condition despite additional rotational operating actions of the operating device.

2. The motor vehicle operating system according to claim 1, wherein the monitoring operating condition comprises a plurality of partial monitoring operating conditions between which a switching occurs via a respective rotational operating action of the operating device.

3. The motor vehicle operating system according to claim 1, wherein the rotation of the operating device is about a predefined angle of rotation to cause the rotational operating action.

4. The motor vehicle operating system according to claim 1, wherein the vehicle monitoring system is operatively configured to monitor at least one of a degree of wear of vehicle components, a fuel or fluid tank level, an environment of the vehicle, and tire pressure of the vehicle.

5. The motor vehicle operating system according to claim 1, further comprising a graphic motor vehicle object displayed on the display device in the zoom operating condition, said graphic motor vehicle object marking a position of the motor vehicle relative to the road map information.

6. The motor vehicle operating system according to claim 5, wherein the graphic motor vehicle object is displayed on the display device in the monitoring operating condition, said graphic motor vehicle object marking a component or an area to which the vehicle information relates which is displayed in the monitoring operating condition.

7. The motor vehicle operating system according to claim 5, wherein the graphic motor vehicle object is automatically displayed to be larger at a larger display scale.

8. The motor vehicle operating system according to claim 6, wherein the graphic motor vehicle object is automatically displayed to be larger at a larger display scale.

9. The motor vehicle operating system according to claim 5, wherein the graphic motor vehicle object displayed in the monitoring operating condition is larger than the graphic motor vehicle object displayed in the zoom operating condition.

10. The motor vehicle operating system according to claim 6, wherein the graphic motor vehicle object displayed in the monitoring operating condition is larger than the graphic motor vehicle object displayed in the zoom operating condition.

11. The motor vehicle operating system according to claim 7, wherein the graphic motor vehicle object displayed in the monitoring operating condition is larger than the graphic motor vehicle object displayed in the zoom operating condition.

* * * * *